(12) United States Patent
Doronin (10) Patent No.: US 9,506,448 B2
(45) Date of Patent: Nov. 29, 2016

(54) ALTERNATIVE HYDROELECTRIC POWER PLANT

(76) Inventor: Valeriy Mihaylovich Doronin, Moscow (RU)

( * ) Notice: Subject to any disclaimer, the term of this patent is extended or adjusted under 35 U.S.C. 154(b) by 161 days.

(21) Appl. No.: 14/362,922

(22) PCT Filed: Dec. 12, 2011

(86) PCT No.: PCT/RU2011/000978
§ 371 (c)(1),
(2), (4) Date: Jun. 5, 2014

(87) PCT Pub. No.: WO2013/089579
PCT Pub. Date: Jun. 20, 2013

(65) Prior Publication Data
US 2016/0025063 A1    Jan. 28, 2016

(51) Int. Cl.

| | |
|---|---|
| F03B 13/00 | (2006.01) |
| F03B 7/00 | (2006.01) |
| E02B 9/00 | (2006.01) |
| F03B 13/06 | (2006.01) |
| F03B 3/12 | (2006.01) |
| H02K 7/18 | (2006.01) |
| H02K 53/00 | (2006.01) |
| F03D 9/00 | (2016.01) |

(52) U.S. Cl.
CPC ............... *F03B 7/006* (2013.01); *E02B 9/00* (2013.01); *F03B 3/12* (2013.01); *F03B 13/06* (2013.01); *F03D 9/008* (2013.01); *F03D 9/14* (2016.05); *H02K 7/1807* (2013.01); *H02K 7/1823* (2013.01); *H02K 53/00* (2013.01); *F05B 2240/9112* (2013.01); *Y02E 10/22* (2013.01); *Y02E 60/17* (2013.01)

(58) Field of Classification Search
CPC ........................................................ F03B 13/00
USPC ............................................................ 290/54
See application file for complete search history.

(56) References Cited

U.S. PATENT DOCUMENTS

| 512,352 | A | * | 1/1894 | Zwiebel | ................ | F01B 17/02 185/4 |
| 4,311,011 | A | * | 1/1982 | Lewis | ................ | F03D 9/007 290/1 D |
| 5,905,312 | A | * | 5/1999 | Liou | ................ | F03B 17/005 290/54 |
| 6,420,794 | B1 | * | 7/2002 | Cao | ................ | F03B 17/005 290/43 |

(Continued)

FOREIGN PATENT DOCUMENTS

| CN | 101122282 A | * | 5/2008 |
| CN | 201786576 U | | 4/2011 |

(Continued)

*Primary Examiner* — Joseph Waks (57) ABSTRACT

Alternative hydroelectric power plant uses a volume of water necessary for operation in a closed circuit. Hydroelectric power plant consists of a structure for mounting a head water reservoir at a requisite height, the structure including a building with a machine room, a device for supplying water to a hydraulic turbine, the head water reservoir and a tail water reservoir and balanced conveyor-type water-lifting apparatuses which can be set into motion by wind energy, starting from a low-velocity wind, by the energy from the water used in the hydraulic turbine and by the actual hydraulic turbine, by transmitting rotational motion from the hydraulic turbine to the conveyor-type water-lifting apparatuses, which provide for lifting water to the requisite height in order to create the pressure necessary for operation of the hydraulic turbines.

6 Claims, 2 Drawing Sheets

(56) References Cited

U.S. PATENT DOCUMENTS

| | | | |
|---|---|---|---|
| 7,956,485 B1 * | 6/2011 | Simnacher | F03B 13/06 290/55 |
| 8,030,790 B2 * | 10/2011 | Kamenov | F03B 13/06 290/43 |
| 8,143,740 B1 * | 3/2012 | Simnacher | F03B 13/06 290/44 |
| 8,492,918 B1 * | 7/2013 | Kamenov | F03D 9/025 290/43 |
| 2003/0102676 A1 * | 6/2003 | Rembert | F03D 9/023 290/54 |
| 2011/0133467 A1 * | 6/2011 | Stiles | F03B 13/00 290/55 |

FOREIGN PATENT DOCUMENTS

| | | | |
|---|---|---|---|
| DE | 3935063 | A1 | 4/1991 |
| JP | 57188783 | A * | 11/1982 |
| JP | 2004019626 | A * | 1/2004 |
| KR | 20070001009 | A | 1/2007 |
| KR | 20130075306 | A * | 7/2013 |
| RU | 2067085 | C1 * | 9/1996 |
| RU | 2259497 | C1 * | 8/2005 |
| SU | 179248 | A | 3/1966 |
| SU | 1772411 | A1 | 10/1992 |
| SU | 1823915 | A3 * | 6/1993 |
| WO | 2010150932 | A1 | 12/2010 |

* cited by examiner

ALTERNATIVE HYDROELECTRIC POWER PLANT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY AN INVENTOR OR JOINT INVENTOR

Not Applicable

BACKGROUND OF THE INVENTION

Field of the Invention

The invention relates to electrical power plants, and particularly to a hydroelectric power plants for generating ecologically pure electricity from renewable energy sources and the production of pumps set into motion by wind energy, starting from a low-velocity wind, and by the energy of the water.

Description of Related Art

Due to the world environmental degradation, the gradual depletion of organic and nuclear fuels and their appreciation, the drawbacks of hydroelectric power plants (HPP) and limited water resources people force us to look for alternative sources of energy.

The principle of a conventional hydroelectric power plant (HPP) operation is simple enough. The dam provides the necessary pressure of water supplied to the blades of the hydraulic turbine, which drives generators, producing electricity. The water expanse upstream the dam is called head water and the reservoir for storing the water used for generation of electricity is called a head water reservoir (HWR). The water expanse downstream the dam is called tail water, and if it is a reservoir as at a pumped storage power plant (PSPP) it is called a tail water reservoir (TWR).

An example of known hydroelectric power plant is found in SU179248, published on 23 Nov. 1966, by A. M. Shakhmatov et al. which relates to a micro hydroelectric power plant comprising a hydraulic turbine, which drives a generator, producing electricity, a device for supplying water to a hydraulic turbine and a water-guiding device.

Another example is found in WO 2010150932, published on Dec. 29, 2010, which relates to a power generation apparatus for producing electricity through a process in which a windmill mounted at a predetermined height of a building is rotated by valley wind and a process in which water is pumped from a lower position up to the height of a high rise building using electric energy obtained through wind power generation and dropped.

The level difference between the head water and the tail tale water determines water pressure H. Thus, HPP power is determined by the flow rate and water pressure.

HPP Advantages

Hydropower as an energy source has fundamental advantages compared to coal or nuclear fuel. It does not need to be mined and processed; it gives no hazardous waste and air emissions. The cost of HPP electric power is very low. HPP generators can be enabled and disabled quite quickly depending on the energy consumption. It is a renewable energy source. No air pollution observed.

HPP Drawbacks

HPP construction is a long-term and rather expensive process. HPPs are absolutely associated with large rivers. Reservoirs may occupy vast territories so they are out of economic use. The microclimate of the neighbouring territories gradually changes. Dams may cause damage to fisheries, blocking the way to spawning grounds. High dams are of particular danger upon their accidental or intentional destruction.

Another alternative hydroelectric power plant (AHPP) structure is a pumped storage power plant (PSPP) structure comprising two reservoirs, mounted at different heights and coupled with each other through pipes and generating apparatuses. Every day the water is pumped from HWR into TWR. The PSPP is involved in levelling the load curve daily discontinuity. While operating the PSPP uses either systems of generators and pumps, or balanced hydroelectric sets, operable both in generating mode and in pumping. In the course of a night cut-off PSPP is supplied with relatively cheap energy of the grid and consumes it for water pumping into the head water (pumping mode). At morning and evening energy consumption peaks the PSPP discharges water from HWR into TWR, thus generating valuable peak energy, subsequently supplied to the grid (generating mode).

PSPP Advantages:
  providing an increased pressure;
  choosing construction location for them is easier than for an HPP;
  consuming less water, due to its circulating between the HWR and the TWR;
  being not effected with water discharge seasonal variations.

PSPP Drawbacks:
  a level difference required for arranging a HWR and a TWR;
  a large scope of earth and concrete works,
  complexity of the devices for supplying water to hydraulic turbines;
  long-term and expensive mounting.

Thus, the present invention is aimed at providing an alternative hydroelectric power plant (AHPP) structure characterized in that:
  when generating ecologically pure electricity from renewable energy sources, it provides all the advantages of an HPP and has no drawbacks peculiar to the latter;
  it neither occupies the area of rivers and nor uses river dams, while the territory occupied by AHPP not only remains involved into economic use but also increases several times;
  a structure being constructed for mounting a head water reservoir at a requisite height and a tail water reservoir mounted downstream is used;

balanced conveyor-type water-lifting apparatuses (BCWLA) is used, which are set into motion by wind energy, starting from a low-velocity wind, by the energy of the water used in the hydraulic turbine and by the actual hydraulic turbine, by transmitting rotational motion from the hydraulic turbine to the balanced conveyor-type water-lifting apparatuses, which provide the lifting of water to the requisite height in order to create the pressure necessary for operation of the hydraulic turbines;

it can operate both in standalone mode and as a part of a power system;

it uses the same volume of water necessary for AHPP operation in a closed circuit;

it is mounted quickly, due to being totally comprised of units, aggregates, and structure elements able to be produced at industrial enterprises as complete sets, to be delivered to the site of mounting and to be mounted in short terms.

BRIEF SUMMARY OF THE INVENTION

An alternative hydroelectric power plant for producing ecologically pure electrical energy from renewable sources, not using river dams, recirculating the required water volume in a closed cycle, comprises a hydraulic turbine, which drives a generator producing electricity, a structure for mounting a head water reservoir at a requisite height, the structure including a building with a machine room, a device for supplying water to the hydraulic turbine, the head water reservoir, a tail water reservoir,
balanced conveyor-type water-lifting apparatuses, which are set into motion by wind turbines with a vertical rotation axis, the wind turbines being driven by wind energy, starting from a low-velocity wind,
and other balanced conveyor-type water-lifting apparatuses, which are set into motion by water wheels driven by energy of water used in the hydraulic turbine and by the actual hydraulic turbine, by transmitting rotational motion from the hydraulic turbine to the balanced conveyor-type water-lifting apparatuses, which provide for lifting water to the requisite height in order to create the pressure necessary for operation of the hydraulic turbine, the structure being rapidly erectable due to consisting entirely of units, assemblies and elements which can be produced as a full set at industrial works, delivered to the mounting site and erected in a short period of time.

These and other features of the present invention will become readily apparent upon further review of the following specification and drawings.

BRIEF DESCRIPTION OF THE SEVERAL VIEWS OF THE DRAWING

In FIGS. 1-4 a schematic structure of an AHPP is shown. FIG. 1 (front view), FIG. 2 (left side view), FIG. 3 (right side view), FIG. 4 (top view). 1—TWR reservoirs, 2—HWR reservoirs, 3—a pipeline connecting the HWR reservoirs, 4—a pipeline, supplying water to the hydraulic turbine, 5—a pipeline connecting the TWR reservoirs, 6—valves and fittings, 7—a wind turbine with vertical rotation axis, 8—tressels for the wind turbine mounting and maintaining, 9—installation lines for BCWLA set into motion by the wind turbines, 10—passages for mounting the BCWLA, set into motion by the wind turbines, 11—passage for mounting BCWLA, set into motion by moving water used in the hydraulic turbine and by the actual hydraulic turbine, 12—sites for mounting BCWLA, set into motion by moving water used in the hydraulic turbine and by the actual hydraulic turbine, 13—a machine room, 14—a machine room entrance, 15—stairs, 16—a lift, 17—a hydraulic turbine and generator, 18—a site for mounting a water wheel, 19—stages for commercial use, 20—platforms for mounting and maintaining BCWLA, set into motion by moving water used in the hydraulic turbine and by the actual hydraulic turbine.

In FIGS. 5 (front view) and 6 (side view) a schematic structure of a BCWLA is shown.

21—a BCWLA upper module, 22—a BCWLA lower module, 23—a wind turbine with vertical rotation axis, wherein the torque being transmitted to the BCWLA through a bevel gear, 24—an endless belt with a hydrophilic layer, 25—a BCWLA upper module drive pulley, 26—a BCWLA upper module pulley arranged in a mirror-like manner, 27—a BCWLA lower module pulley, that becomes the drive one, when BCWLA is set into motion by the water used in the hydraulic turbine and by the actual hydraulic turbine, 28—a BCWLA lower module pulley arranged in a mirror-like manner, 29—a mangle mechanism, 30—an intake water chamber, 31—a balancing mechanism, 32—water level.

DETAILED DESCRIPTION OF THE INVENTION

An alternative hydroelectric power plant (AHPP) consists of:
a structure for mounting HWR at a required height and mounting TWR downstream;
a HWR and a TWR;
BCWLA, providing water-lifting up to a requisite height for creating pressure H;
a building with a machine room housing a device for supplying water to the hydraulic turbine and to the BCWLA.

An alternative hydroelectric power plant comprises a hydraulic turbine, which drives a generator 17 producing electricity, a structure for mounting a head water reservoir at a requisite height, the structure including a building with a machine room 13, a device 4 for supplying water to a hydraulic turbine, the head water reservoir 1, and a tail water reservoir 2 mounted downstream, balanced conveyor-type water-lifting apparatuses 9, which are set into motion by wind turbines 7 with a vertical rotation axis, the wind turbines 7 being driven by wind energy, starting from a low-velocity wind, and other balanced conveyor-type water-lifting apparatuses 12, which are set into motion by the energy of the water wheels 18 driven by energy of water used in the hydraulic turbine and by the actual hydraulic turbine, by transmitting rotational motion from the hydraulic turbine to the balanced conveyor-type water-lifting apparatuses 12, which provide for lifting water to the requisite height in order to create the pressure necessary for operation of the hydraulic turbines.

A structure for mounting HWR at a height to provide a required water pressure may be a steel, reinforced concrete or other sort of a structure. Thus the construction can be pre-fabricated. Unlike a PSPP, an AHPP does not require any natural height level difference for mounting the HWR and there is no need for large scope of earth and concrete works to arrange reservoirs.

Other structures may include: a bulk structure for arranging an HWR, wherein a TWR is arranged nearby, if a natural height level difference is present.

The structure base providing HWR mounting comprises a building with a machine room 13 and a device 4 for supplying water to the hydraulic turbine and to the BCWLA.

The most efficient use of the energy of a water flow supplying water to the hydraulic turbine is possible due to the water level difference concentration for a comparatively short section. If a natural height level difference is present the solution is simplified, though such conditions are rather rare. For an AHPP it is inherent to the design, as the pipeline 4 supplying water to the hydraulic turbine and connected to the HWR tanks may be arranged vertically.

HWR 2 and TWR 1 represent a set of equal tanks, interconnected with pipelines 3 and 5. The HWR 2 has an upper pipeline and a lower pipeline. The upper pipeline provides filling the HWR tanks from above, and the lower one connects them on a communicating vessels principle. Each tank is equipped with valves and fittings: taps, isolating the tanks from the pipelines for repair, and emergency valves. The number of HWR and TWR tanks is in direct proportion to the AHPP capacity.

In case an AHPP is permanently connected to a non-congealable natural water source, able to meet the AHPP water requirements the source acts as a TWR.

For an HPP the pressure H generated by the dam equals the difference between the upper HWR level and the upper TWR level, therefore the dam is exposed to enormous loads. For an AHPP the HWR water level may be insignificant as the pressure H equals the difference between the HWR bottom level and the TWR top level. Consequently the specific load of the structure for HWR arrangement is not high.

Balanced conveyor-type water-lifting apparatuses (BCWLA) 9, set into motion by wind energy, starting from a low-velocity wind (less than 5 m/s), balanced conveyor-type water-lifting apparatuses BCWLA 12 set into motion by the energy of the water used in the hydraulic turbine and by the actual hydraulic turbine, by transmitting rotational motion from the hydraulic turbine to the balanced conveyor-type water-lifting apparatuses, provide the lifting of water to the requisite height in order to create the pressure necessary for operation of the hydraulic turbines.

In case a TWR 1 is arranged downstream under a HWR 2, the BCWLA take water directly from the TWR1. In case a TWR 1 is arranged downstream next to a HWR 2, passages connected to TWR 1 are arranged for supplying BCWLA with water.

Figure 1:
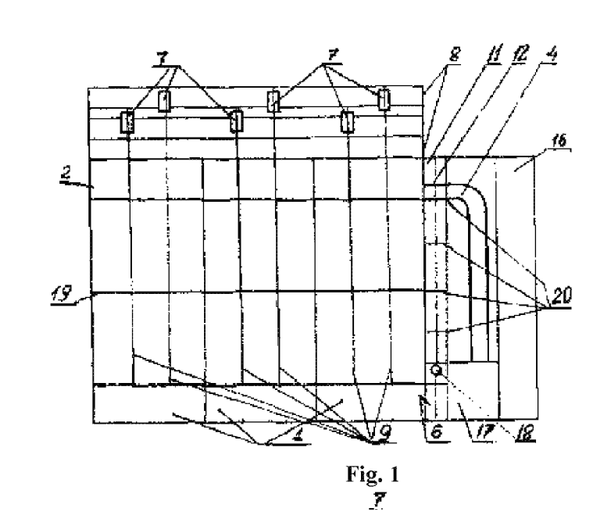
Figure 2:
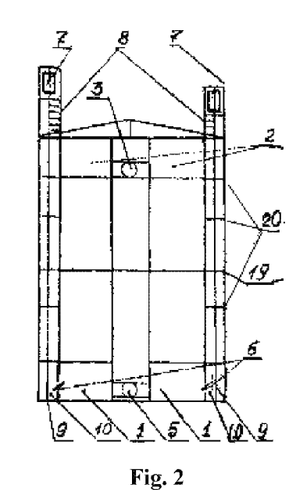
Figure 3:
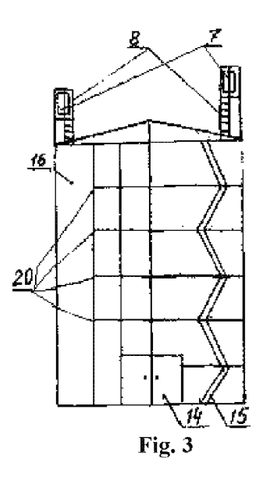
Figure 4:
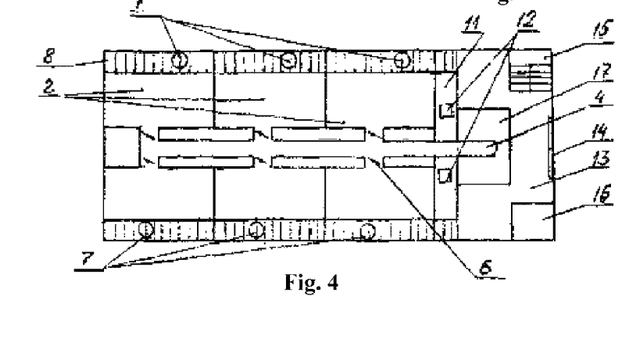
Figures 5, 6:
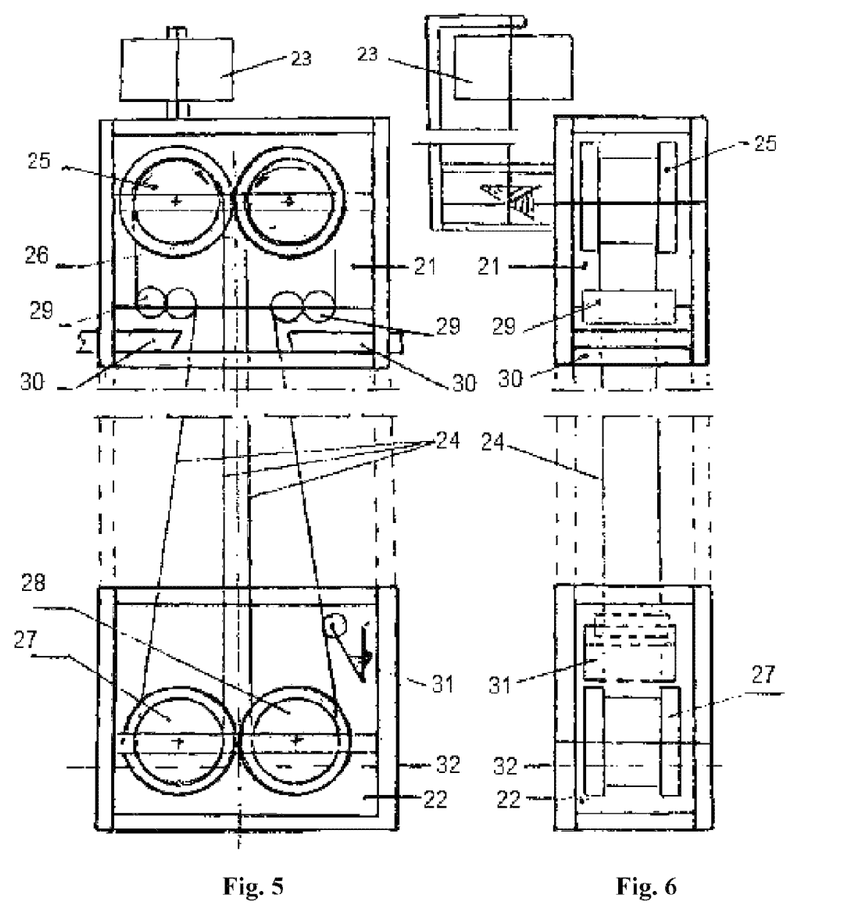

The conveyor-type water-lifting apparatuses (CWLA), which provide the lifting of water to the requisite height in order to create the pressure H, consist of an endless belt, stretched over the pulleys mounted on the upper and lower spindles, one of which being the drive one. The lower pulley is partially or completely immersed into the water. The belt is provided with a hydrophilic material that lifts the water absorbed or the material the belt is comprised, and is able to absorb water to be lifted to the requisite height. Under the upper pulley a mangle roll is provided for removing the water lifted by the conveyor belt.

The CWLA can be set into motion by the drive pulley rotation.

The prior art conveyor-type water-lifting apparatuses (CWLA) are known from the following: SU 1823915 A3, 24 Apr. 1990, SU 866265 A, 28 Sep. 1981. SU 205565 A, 19 Jan. 1968. SU 1534209 A1, 7 Jan. 1990. SU 1 121483 A, 30 Oct. 1984. DD 224076 A1, 26 Jun. 1985. GB 14 1 5435 A, 26 Nov. 1975. RU 2259497 C1, 23 Apr. 2004, RU 2353803 C1, 16 Jul. 2007.

For lifting the water in order to create the necessary pressure H it is suggested to use balanced conveyor-type water-lifting apparatuses (hereinafter BCWLA) set into motion by wind energy, starting from a low-velocity wind, by the energy of the water used in the hydraulic turbine and by the actual hydraulic turbine, by transmitting rotational motion from the hydraulic turbine to the balanced conveyor-type water-lifting apparatus possessing a considerable operating life.

A prior art of the BCWLA as suggested is a CWLA according to RU 2259497 C1, set into motion by wind energy.

The prior art apparatus has two drawbacks: 1—impossibility to use the low-velocity wind energy due to the drive pulley being unbalanced, 2—structure complexity and impossibility to use the energy of the water used in the hydraulic turbine and by the actual hydraulic turbine.

The drive pulley of the CWLA according to RU 2259497 C1 being unbalanced, it is impossible to use the low-velocity wind energy for setting the CWLA into motion. The CWLA belt side, being water-soaked from the water level, the lower pulley is immersed to, and up to the mangle roll, is referred to as a loaded side, and the CWLA belt opposite side is referred to as an unloaded side. The part of the lifting belt from the water level to the mangle mechanism is soaked with water, thus being heavier than the lifting belt part downstream the mangle mechanism by the value equal to the weight of the water having been removed out of the lifting belt by the mangle mechanism. This misbalance is constantly present. To provide CWLA rotation it is required a wind velocity of a force exceeding the force required to overcome the unbalance. Furthermore the CWLA rotating parts are tended to rapid wear causing the operational lifetime drop-down.

To eliminate the CWLA mechanism unbalance it is provided with a second like CWLA mechanism arranged next to the first one in a mirror-like manner. The upper and the lower pulleys of the first mechanism hereinafter referred to as the drive one, set into motion the upper and the lower pulleys of a second, driven mechanism arranged in a mirror-like manner wherein the pulleys being rotated in the direction opposite to the first mechanism rotation direction. The motion may be transmitted by a friction gear, a tooth gear, a chain or a belt gear, with a belt arranged in the eight-shaped manner. The balanced CWLA mechanisms are mounted in order to arrange the loaded sides of the lifting belts facing outside, and the unloaded ones—facing inside the CWLA placed in a mirror-like manner to one another.

As a result the unloaded side of the water lifting drive mechanism is loaded with the loaded side of the driven water-lifting mechanism placed in a mirror-like manner. The load of the loaded side of the mechanism placed in a mirror-like manner equals the load of the drive mechanism unloaded side, reduced by the value of a friction observed when transmitting motion from the mechanism placed in a mirror-like manner. In such a way the unbalance is eliminated.

BCWLA balancing mechanism comprises a mangle roll, fixed upon a pivotable arm with an adjust screw for adjusting the arm position, between the belt with the hydrophilic material attached and a rigidly fixed retaining bracket, thus changing the distance between the mangle roll and the belt with the hydrophilic material attached, and subsequently regulating the weight of the water, lifted by the CWLA placed in a mirror-like manner. The balancing mechanism is mounted as close as possible to the lower pulley of the CWLA placed in a mirror-like manner, at its loaded side.

BCWLA mechanism is designed for lifting water up to dozens of meters. To prevent the BCWLA belts from whipping and vibrating at the sections between the drive pulley and the driven one, stabilizing roll pallets are provided. The roll mounted on the belt internal side generally has a cylindrical shape. The roll mounted on the belt external side has a recess made within the cylindrical shape, the recess being equal to the cross section of the hydrophilic material attached to the belt. Whereby the belt is broader than the hydrophilic material strip attached thereto symmetrically relative to the longitudinal axis. The number of the stabilizing roll couples depends on the height the BCWLA water is to be lifted to.

A prior art of a BCWLA solution uses a horizontal axis wind turbine having a wind-orientation device. A prior art of a CWLA with a wind turbine is mounted into a mobile housing pivotable about its vertical axis inside the fixed housing. This complicates the structure, makes it more expensive, meanwhile not allowing for setting CWLA into motion by the energy of the water used in the hydraulic turbine and by the actual hydraulic turbine.

To overcome this drawback it is suggested to use a wind turbine with a vertical rotation axis transmitting the torque to the BCWLA horizontal drive spindle through a bevel gear, a tooth gear or a friction gear, directly or through a gearbox. In this case, only one fixed housing enclosing a BCWLA and the structure becomes considerably simpler, safer and cheaper.

When a BCWLA mechanism is used for water-lifting up to dozens of meters, it can be divided into modules. The upper module contains two pulleys, a mangle mechanism and an intake water chamber, enclosed within a housing. The lower module contains two pulleys and a balancing mechanism enclosed within the housing. The necessity of a bulk BCWLA housing is eliminated. The upper module and the lower module can be mounted directly into the AHPP structure. The use of the BCWLA module system leads to BCWLA cheapening.

A BCWLA mechanism as suggested can be applied within three apparatus embodiments providing the pressure H, required for AHPP operation:

BCWLA 1—an apparatuses set into motion by wind energy, starting from a low-velocity wind with an upstream drive spindle.

BCWLA 2—an apparatuses set into motion by the energy of the water used in the hydraulic turbine with a downstream drive spindle;

BCWLA 3—an apparatuses set into motion by the energy of the actual hydraulic turbine with a downstream drive spindle;

BCWLA 1

The fact that BCWLA 1 will operate even at a low-velocity wind, can be seen from the example of a car wheel balanced by means of a balancing stand. After a slight touch a heavy wheel starts rotating and keeps rotating for some time by inertia after stopping the force which sets it into motion.

An unbalanced wheel starts moving after applying the force exceeding the unbalance weight, and after stopping the force it starts pendulum motion relative to the unbalance point and stops rather soon.

BCWLA 2

The water used in the hydraulic turbine is ejected out of the latter in a powerful jet. For using the jet energy a hydraulic wheel is provided. It is rotated by the jet of the water used in the hydraulic turbine and sets BCWLA 2 into motion. The hydraulic wheel may be mounted directly upon the BCWLA 2 drive spindle or by means of a friction gear, a tooth gear, a chain gear or a belt gear performing the transmission from the hydraulic wheel to the BCWLA 2.

BCWLA 3

The hydraulic turbine is perfectly balanced, therefore if the turbine spindle is loaded with BCWLA 3, at a constant rotation rate the hydraulic turbine load equals just the friction load of the BCWLA 3 rotating parts. Today, there is a wide choice of plain and rolling bearings, whose use will minimize the friction of the BCWLA rotating parts. The torque can be transmitted from the hydraulic turbine to BCWLA 3 through a friction gear, a tooth gear a chain or a belt gear.

The volume of the water lifted by the BCWLA 2 and the BCWLA 3 during AHPP operation—is a constant value. The volume of the water lifted by the BCWLA 1—is a variable, depending on the wind velocity. Besides, there are periods of no wind at all. Therefore the number of BCWLA 1 operating at an AHPP, is determined by the prevailing winds conditions at AHPP location. The wind velocity annual amplitude for most territory of Russia is low making at an average 2-3 m/s, changing across the country from 1 to 4 m/s. The volume of the water lifted by a BCWLA is small, so the AHPP usually comprises as many of BCWLA as necessary for lifting the volume of water required for AHPP operation.

An AHPP like an HPP depending on the maximal water pressure consumption can be divided into low-pressure ones—from 3 to 25 m, middle-pressure ones—from 25 to 60 m and high-pressure ones—over 60 m. If BCWLA 1 capacity is not enough for lifting water up to the height required the lifting is performed in stages. With this purpose intermediate stages are arranged in the structure for mounting HWR, wherein reservoirs and BCWLA 1 are arranged. Lifted from the TWR the water is supplied thereto, and consequently is lifted either to the HWR, or into the intermediate stages reservoirs.

The technical effect of the invention lies in providing an AHPP, wherein:
- the AHPP is able to generate ecologically pure electrical energy from renewable sources within a wide power range;
- similar to an HPP the AHPP is highly efficient, economical and easy to control, requires relatively few maintaining staff, demonstrates maneuverability when generating electricity under varying loads, has a long service life, low electricity cost, provides a process for electricity generation, not accompanied by environmental pollution, has a low electricity consumption for its own needs;
- unlike an HPP the AHPP does not require long-term and expensive mounting, flooding large areas, does not alter the river flow and climate, has no restrictions upon the choice of the construction site;
- the AHPP may operate autonomously or within an electric power system;
- the AHPP can be constructed close to the electric power consumption sites, wherein the necessity of extended power lines is eliminated as well as transformer yards construction and great nonferrous metal consumption;
- similar to an PSPP the AHPP subjects to seasonal discharge fluctuations, may have increased pressure, requires less water, as water circulates between TWR and HWR, whose site of construction is difficult to chose;
- unlike a PSPP the AHPP does not require any natural height level difference for mounting HWR and TWR, a large scope of earth and concrete works, having relatively simple device for supplying water to hydraulic turbine;

the AHPP does not use river dams and the very rivers, as water pressure is produced by a BCWLA, set into motion by wind energy, by the energy of the water used in the hydraulic turbine and by the actual hydraulic turbine, and for mounting HWR at a required height to provide the water pressure H, a steel or reinforced concrete onshore construction is used, located beyond the river or any other water basin and recirculating the same water volume in a closed cycle;

the AHPP allows for quick-mounting, being pre-fabricated of units, aggregates and structure elements, able to be produced at industrial enterprises as complete sets to be delivered to the site of mounting and to be mounted in short terms;

besides being involved into economic use the territory occupied by AHPP is several times increased as far as the structure space between the HWR and BHE can be divided into stages for arranging industrial, agricultural and commercial enterprises;

the AHPP allows for a short-term establishment of the necessary infrastructure for reconfiguring transport, including farm machinery, into a battery drive, as AHPP can be constructed with required intervals all along the roads, to charge the batteries in quite a fast and economical manner;

the BCWLA being used set into motion by wind energy, starting from a low-velocity wind, by the energy of the water may provide any agricultural producer with cheap, ecologically pure irrigated cropping.

the AHPP structure demonstrates anti crash features. HWR and TWR represent a set of identical reservoirs interconnected with pipelines equipped with stop valves stopping the connections between the reservoirs and the pipelines for repair and with emergency valves that close automatically, in emergency. To exclude the possibility of pouring a lot of water it is possible to use soft reservoirs of durable elastic materials as HWR and TWR reservoirs. Each of the reservoirs is enclosed into a casing. The reservoir material should have sufficient strength to maintain integrity when being transformed in a case of emergency, seismic or other type of disaster.

To provide AHPP operation at negative temperatures the following two methods can be applied.

Method 1—using an aqueous solution, non-freezing at negative temperatures;

Method 2—enclosing all the AHPP structure into a casing with a positive temperature maintained therein. The AHPP capacity is initially increased by the power value, required for providing necessary temperature inside the casing. It is possible to use ground heat either after integrating into the AHPP design a structure suitable for consuming this heat. In this case the HWR is placed above the TWR.

To provide wind turbines operation at negative temperatures the anti-icing systems and means used in aviation can be applied.

Besides being involved into economic the territory occupied by a AHPP is several times increased. The structure space between HWR and TWR may be covered with a transparent material and divided into stages to be used with industrial, agricultural and commercial purposes thus allowing for a faster pay-back of the funds required for constructing AHPP. HWR and TWR can be used for fisheries. Between HWR and TWR several stages can be arranged to be used for highly mechanized all year round growing vegetables, flowers and possibly fruit using hydroponics and precision agriculture. As AHPP can be arranged adjacent to cities, the TWR the space under the HWR can be used as aqua parks, swimming pools and recreational islands, imitating sea-shoes. After passing the turbine water becomes germless, for germs die out therein. As the water circulates in the AHPP in a closed cycle, it will stay pure all the time, making a further advantage.

BCWLA can be used as pumps for lifting water to reservoirs at a height, required for supplying agricultural land to be irrigated with water by gravity. Simple and inexpensive BCWLA can be mounted even at small rivers and springlets. To improve BCWLA performance, in areas with very low wind velocity, the slow moving water energy can be used. With this purpose under the BCWLA, set into motion by a wind turbine, a water wheel is provided, being rotated with a stream flow, thus assisting the wind turbine, mounted above, to lift water to the reservoirs placed on platforms.

The platforms represent built-up frame structures for mounting the water reservoirs at a height required for supplying the irrigation area with water by gravity. They can be quickly arranged for irrigation, and then dismantled and stored until next season. The water source may be far from the irrigation site. The platforms can be arranged together with BCWLA, close to the water source, wherefrom water can be supplied through the pipes to the irrigation site by gravity. The platforms can be arranged adjacent to the irrigation site. In this case the BCWLA is connected to the reservoir on the platform on a communicating vessels principle, by means of a pipe laid on the ground. The first pipe end is connected to the BCWLA, and the second one—to the reservoir on the platform.

For economical water consumption drip watering may be applied. With this purpose thing perforated polyethylene pipes should be laid through the agricultural lands between planted croppers, the pipes being connected to the water reservoirs placed at a required height.

By dissolving the fertilizer in water it is possible to produce plant nutrition through drip watering allowing for efficient and economical use of fertilizer thus saving oil products. At the end of the application terms, the pipes are wound onto spools and put out for storage. This will ensure the equipment safety and longevity.

Possibilities Provided with AHPP.

Applying AHPP allows for quick and inexpensive solution of economical and ecological problems concerned with the world-wide high prices and the necessity of fuel consumption for energy.

An AHPP is an inexhaustible source of cheap environmentally friendly electrical energy, able to supply any region all over the world with a required quantity of cheap environmentally friendly electrical energy from renewable sources. This can be accomplished in the shortest period of time.

An AHPP can be constructed at any place where the wind may be, and the wind can be found everywhere. In the regions scarce of water, it may be delivered through temporary pipelines, and the AHPP may be filled with, as the water is used in a closed cycle. For the territories with negative seasonal temperatures certain methods are applied to ensure its unfailing service.

The AHPP provides conquering world markets for renewable energy, the conservation of energy resources for future generations, and the increase in raw material consumption for non-energy use of fuel.

In the shortest time the AHPP will supply cheap ecologically pure electrical energy to the decentralized energy supply areas with low population density, in the first place, the Far North and the equivalent areas, areas with problems in supplying energy to private housings, farms, seasonal work places, allotment gardens and the like.

In most regions of Russia an annual average wind speed does not exceed 5 m/s, which makes the wind power engineering development absolutely unprofitable in these regions. Due to the intensive exploitation of natural resources, distancing settlements from centralized sources of electricity there appears rather a deficit generating capacities, which in some cases is impractical to be satisfied by means of the existing power industry.

Along with the production of electricity, the use of an AHPP can make significant contribution into production of food products both of plant and animal origin.

An AHPP constructed close to cities will allow withdrawing industrial enterprises from these cities and locating them in the areas, involved into AHPP construction.

Due to the area deficit the AHPP constructed close to cities may be located above the highways.

Using AHPP will in short terms allow multiply increasing the housing space in the Russian Federation, transforming summer garden cottages around cities into fully-featured accommodation. An AHPP will supply them with cheap energy for heating, providing work places at various enterprises arranged on the platforms sandwiched between the AHPP structure stages, and the entire necessary infrastructure.

Starting industrial production of AHPP requires following steps:
  choosing the material for producing BCWLA belts,
  experimentally determining the optimal ratio between the lifting height and the water volume lifted by one BCWLA, set into motion by low-velocity wind energy. Simply put, determining the amount of water, and the height it will be lifted to with the BCWLA at the lowest wind velocity;
  experimentally determining the water amount to be lifted by BCWLA, set into motion by the energy of the water used in the hydraulic turbine and by the actual hydraulic turbine, by transmitting rotational motion from the hydraulic turbine to the balanced conveyor-type water-lifting apparatuses. These experiments can be completed for several months.

By the experiment results the number of BCWLA corresponding to the AHPP capacity to be produced as a final product and completed in enterprises will be determined.

Today, a wide choice of AHPP assemblies, apparatuses, and elements of domestic and foreign production are available.

The AHPP capacity like the one of an HPP depends on the pressure and consumption of the water, used in the hydraulic turbines and the hydraulic machine efficiency, therefore an AHPP of any capacity can be produced with no need in constructing supergiants. AHPP can be produced for a particular consumer or a group of consumers, for the AHPP structure allows altering its capacity while operating in a non-stop mode.

The invention claimed is:

1. An alternative hydroelectric power plant comprising a hydraulic turbine, which drives a generator producing electricity, characterized in that the hydroelectric power plant does not use river dams, recirculates required water volume in a closed cycle, and comprises: a structure for mounting a head water reservoir at a requisite height, the structure including a building with a machine room, a device for supplying water to the hydraulic turbine, the head water reservoir, a tail water reservoir,
  balanced conveyor-type water-lifting apparatuses, which are set into motion by wind turbines with a vertical rotation axis, the wind turbines being driven by wind energy, starting from a low-velocity wind,
  and other balanced conveyor-type water-lifting apparatuses, which are set into motion by water wheels driven by energy of water used in the hydraulic turbine and by the actual hydraulic turbine, by transmitting rotational motion from the hydraulic turbine to the balanced conveyor-type water-lifting apparatuses, which provide for lifting water to the requisite height in order to create the pressure necessary for operation of the hydraulic turbine.

2. The alternative hydroelectric power plant of claim 1, characterized in that, each balanced conveyor-type water-lifting apparatus is balanced due to comprising two equal conveyor-type water-lifting apparatuses, arranged in a mirror-like manner, one of them being the drive one, the apparatuses being arranged relative to each other in order to place the loaded sides of the lifting belts facing outside, and the unloaded ones—facing inside the balanced conveyor-type water-lifting apparatus, wherein the upper and the lower pulleys of the drive conveyor-type water-lifting apparatus, set into motion correspondingly the upper and the lower pulleys of a conveyor-type water-lifting apparatus, arranged in a mirror-like manner being rotated in the direction opposite to the rotation direction of the drive conveyor-type water-lifting apparatus, such that the unloaded side of the conveyor-type water-lifting apparatus is loaded with the loaded side of the driven conveyor-type water-lifting apparatus, wherein the value of its load is to be reduced by the value of a friction observed when transmitting the load from the driven conveyor-type water-lifting apparatus to the drive conveyor-type water-lifting apparatus, which is performed through a balancing mechanism.

3. The alternative hydroelectric power plant of claim 2, characterized in that the balancing mechanism comprises a mangle roll, fixed upon a pivotable arm with an adjust screw for adjusting the arm position between the belt with the hydrophilic material attached and a rigidly fixed retaining bracket, thus changing the distance between the mangle roll and the belt with the hydrophilic material attached, and subsequently regulating the weight of the water, lifted by the conveyor-type water-lifting apparatus placed in a mirror-like manner.

4. The alternative hydroelectric power plant of claim 1, characterized in that, the territory it occupies is involved into economic use, being several times increased, for the structure space between the head water reservoir and the tail water reservoir is divided into stages for arranging industrial, agricultural and other enterprises.

5. The alternative hydroelectric power plant of claim 2, characterized in that the balanced conveyor-type water-lifting apparatus mounted at any running water source including small rivers and springlets,
  the apparatus being set into motion by the wind turbine with vertical rotation axis, the wind turbine driven by wind energy, starting from a low-velocity wind,
  and being set into motion by the water wheel, rotated with the water flow stream,
  lifts water up to the reservoirs mounted on the platforms at a height required for supplying agricultural land to be irrigated with water by gravity.

6. The alternative hydroelectric power plant of claim 1, characterized in that it has antiseismic and anticrash properties as the head water reservoir and the tail water reservoir consist of a set of equal soft reservoirs made of durable elastic materials each reservoir being enclosed into a casing, the reservoirs being connected to each other and to the turbine water input equipment by means of pipelines, wherein each reservoir is equipped with valves and fittings, automatically isolating the tanks from the pipelines in emergency, seismic or other disaster.

* * * * *